(12) United States Patent
Dicken et al.

(10) Patent No.: US 8,127,560 B2
(45) Date of Patent: Mar. 6, 2012

(54) MACHINED SPRING WITH INTEGRAL RETAINER FOR CLOSED CYCLE CRYOGENIC COOLERS

(75) Inventors: Lane Daniel Dicken, Davenport, IA (US); Arthur R. Nelson, Davenport, IA (US); Dennis Eugene Lund, Jr., Bettendorf, IA (US); Daniel James Belk, Long Grove, IA (US)

(73) Assignee: Carleton Life Support Systems, Inc., Davenport, IA (US)

( * ) Notice: Subject to any disclaimer, the term of this patent is extended or adjusted under 35 U.S.C. 154(b) by 1222 days.

(21) Appl. No.: 11/757,034

(22) Filed: Jun. 1, 2007

(65) Prior Publication Data

US 2008/0295523 A1 Dec. 4, 2008

(51) Int. Cl.
*F25B 9/00* (2006.01)
*F01B 29/10* (2006.01)

(52) U.S. Cl. .................................. 62/6; 60/520
(58) Field of Classification Search .................. None
See application file for complete search history.

(56) References Cited

U.S. PATENT DOCUMENTS

| | | | |
|---|---|---|---|
| 653,155 A | 7/1900 | Tilden | |
| RE14,287 E * | 4/1917 | Knudsen | 267/166 |
| 2,343,079 A | 2/1944 | Pickwell | |
| 3,511,280 A * | 5/1970 | Mercier | 138/30 |
| 3,795,884 A | 3/1974 | Kotaka | |
| 3,851,297 A | 11/1974 | Munro | |
| 3,889,119 A | 6/1975 | Whicher et al. | |
| 3,951,493 A | 4/1976 | Kozel et al. | |
| 4,203,305 A | 5/1980 | Williams | |
| 4,365,982 A | 12/1982 | Durenec | |
| 4,971,146 A * | 11/1990 | Terrell | 166/55 |
| 5,167,582 A | 12/1992 | Hunt | |
| 5,822,994 A * | 10/1998 | Belk et al. | 62/6 |
| 5,878,998 A | 3/1999 | Hsieh | |
| 5,944,302 A * | 8/1999 | Loc et al. | 267/180 |
| 6,151,896 A | 11/2000 | Veringa et al. | |
| 6,236,145 B1 | 5/2001 | Biernacki | |
| 6,287,126 B1 | 9/2001 | Berger et al. | |
| 6,659,778 B2 | 12/2003 | Li | |
| 7,017,344 B2 | 3/2006 | Pellizzari et al. | |
| 7,332,825 B2 * | 2/2008 | Annen et al. | 290/1 A |
| 7,629,699 B2 * | 12/2009 | Annen et al. | 290/1 A |
| 2005/0060996 A1 * | 3/2005 | Pellizzari et al. | 60/517 |
| 2007/0090606 A1 | 4/2007 | Ross et al. | |
| 2008/0295523 A1 | 12/2008 | Dicken et al. | |

FOREIGN PATENT DOCUMENTS

EP 2009318 A1 12/2008

* cited by examiner

*Primary Examiner* — Frantz Jules
*Assistant Examiner* — Lukas Baldridge
(74) *Attorney, Agent, or Firm* — Katherine H. McGuire; Woods Oviatt Gilman LLP

(57) ABSTRACT

A retainer and spring with threaded end are machined from a single piece of material for threading to a piston in a closed cycle cryogenic cooler. Since the machined retainer and spring are a unitary part, they cannot rub against each other during operation of the piston which reduces debris generation. The spring is preferably formed as a double start helix which further increases axial stability and reduces side loading. The spring extends into an integrally formed, threaded end at the end thereof opposite the retainer.

5 Claims, 2 Drawing Sheets

MACHINED SPRING WITH INTEGRAL RETAINER FOR CLOSED CYCLE CRYOGENIC COOLERS

BACKGROUND OF THE INVENTION

The present invention relates to closed cycle cryogenic coolers. More particularly, the present invention relates to an improved piston and spring assembly for use in such cryogenic coolers.

Closed cycle cryogenic coolers (hereinafter "CCCCs") are known, an example of which may be seen in commonly owned U.S. Pat. No. 5,822,994, the entire disclosure of which is incorporated herein by reference. FIG. 1 of the '994 patent is reproduced as FIG. 1 in the instant application and is seen to include expander section 9 having a cylinder 11 and cold-finger assembly 18 within which is located a low friction linear clearance seal liner 15 bonded to a piston 13. The reciprocating movement of piston 13 is controlled in part by a spring/retainer assembly to control the axial motion of the expander. The principle cooling in a CCCC is accomplished through expansion of the helium working fluid. The expansion is made possible by achieving a phase shift between the pressure oscillation from the compressor 7 and the working fluid helium mass flow through the expander 9. The phase shift of the expander displacement is controlled using a spring/retainer configuration. The mechanical connection of the retainer to the expander or piston 13 is typically accomplished by matching the helical pitch of the spring to the other components and threading the assembly together.

FIG. 3 shows an expander section 50 wherein is located a prior art three piece assembly with a helical spring 20 threaded to a retainer 30 at one end thereof and a piston 40 at the opposite end thereof. A common problem with the traditional three piece spring, piston, and retainer designs used in CCCC applications is the inherent relative motion induced by the wound helical spring threading onto the piston and retainer. Any off-axis movement has the potential to cause debris due to surfaces rubbing against each other. An enlarged photo showing debris in the cylinder caused by piston and/or spring off-axis movement is shown in FIG. 2. Such debris degrades the useful life of the piston assembly and decreases operating efficiency of the CCCC.

Many alternative piston/spring approaches have been considered including the use of a Higby cut, rolled "light-bulb" threads, and electro-polishing to reduce the intrinsic debris generation with the current three piece design. None of these approaches have satisfactorily improved the debris generation problem.

There therefore remains a need for a retainer, spring and piston assembly for use in a CCCC which satisfactorily reduces the debris generation and degradation problem of the prior art designs.

SUMMARY OF THE INVENTION

The present invention satisfactorily reduces the debris generation problems of the prior art by providing a retainer and spring having an integral threaded end, all formed from a single piece of material. In a preferred embodiment, the retainer, spring and threaded end is a unitary part machined from a single piece of metal. The spring is preferably a double-start helix design which greatly improves the axial stability of the assembly through its oscillating movements within the CCCC. Since the spring is formed integrally with the retainer and threaded end in a single piece, these parts cannot rub against each other and debris generation is thus substantially reduced.

In addition to the elimination of debris, axial translation of the machined spring results in substantially symmetric deflection, thus eliminating intrinsic rotation of the prior art wound spring and thereby reducing clearance seal side loading. This improves both the operating life of the device as well as its efficiency as a CCCC.

DETAILED DESCRIPTION

Figure 1:
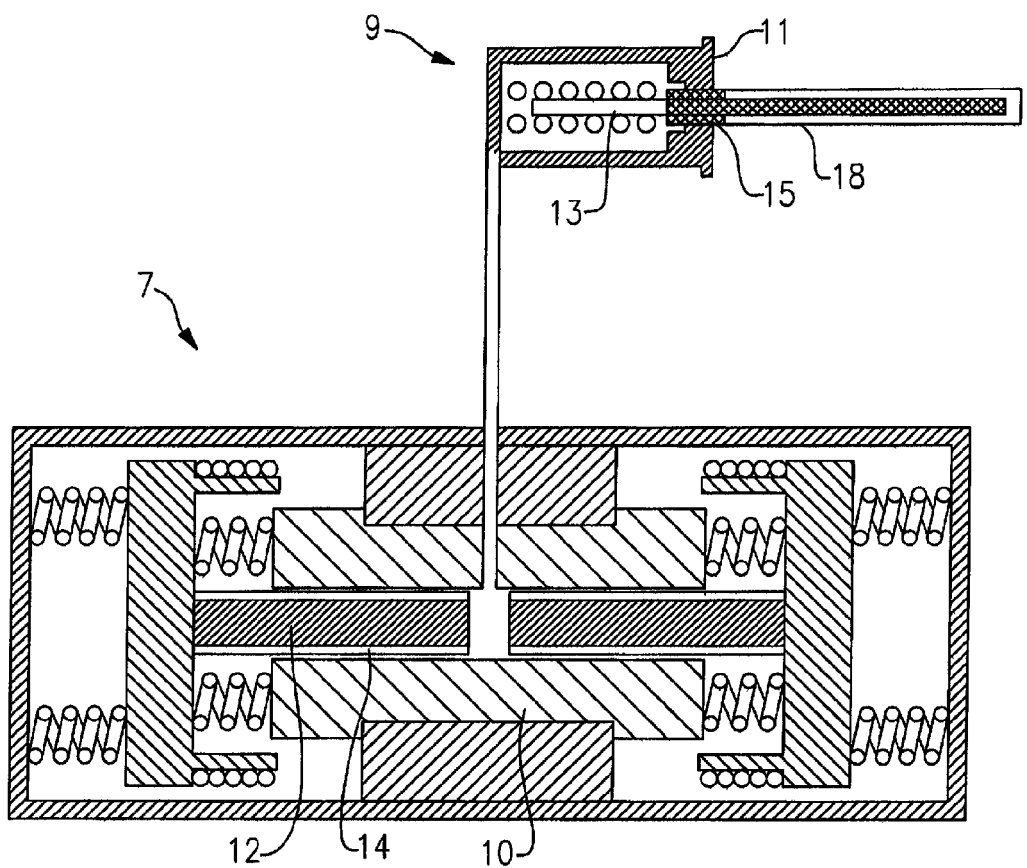
FIG. 1 is a cross-sectional view of a prior art CCCC.
Figure 2:
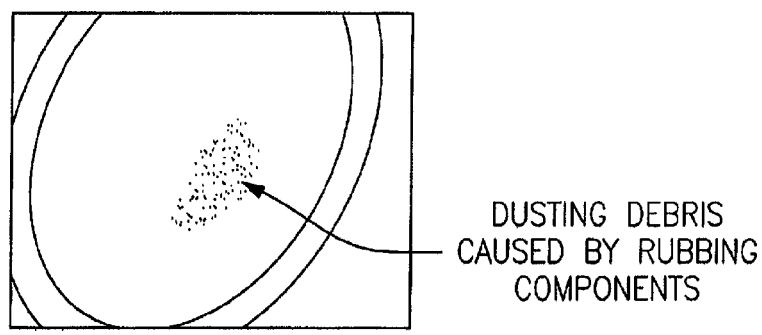
FIG. 2 is an enlarged photo of the inside of a prior art cylinder showing debris accumulation therein.
Figure 3:
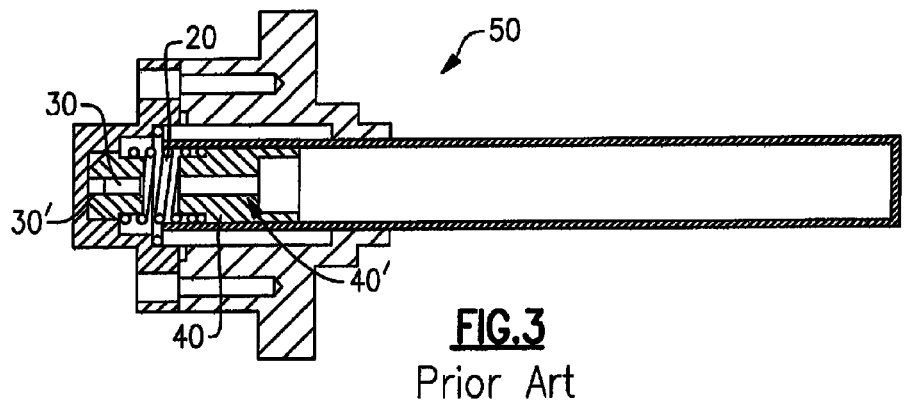
FIG. 3 is a detailed view of the expander section of the CCCC of FIG. 1.
Figure 4:
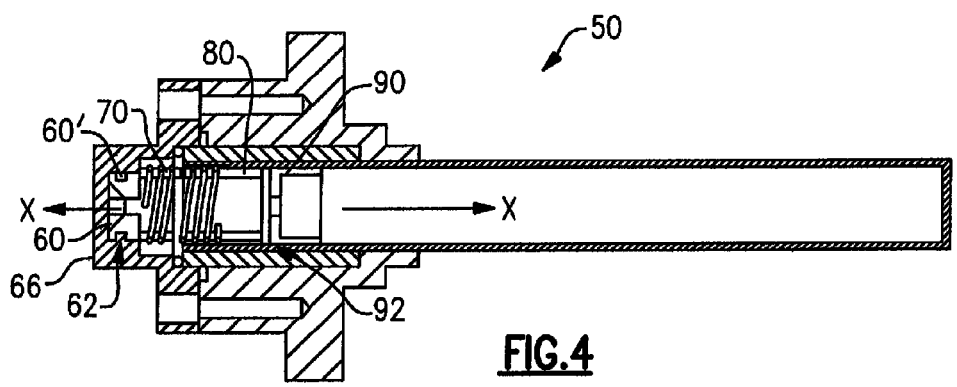
FIG. 4 is a cross-sectional view similar to FIG. 3 but showing the inventive retainer/spring/threaded end element therein.
Figure 5:
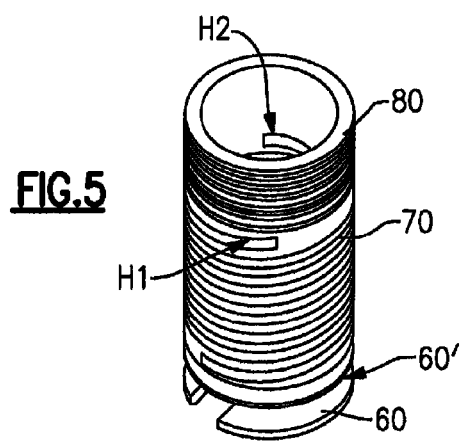
FIG. 5 is an enlarged, perspective view of the retainer/spring/threaded end part of FIG. 4.

Referring now to FIGS. 4 and 5, an embodiment of the inventive retainer/spring/threaded end and piston assembly of the invention will now be described. The retainer/spring/threaded end element has three distinct parts machined from a single piece of metal such as stainless steel, for example: a retainer 60, a spring 70, and a threaded end 80 at the end of spring 70 opposite retainer 60, each having a common passageway aligned along axis X-X. Retainer 60 includes a recessed end 60' which engages a cooperatively formed lip 62 within the CCCC cylinder 66. Threaded end 80 threads into piston 90 which is mounted for reciprocating movement in CCCC expander section 50. As such, during operation of the CCCC, the retainer 60 remains stationary as the piston 90 reciprocates axially (e.g., about 0.050 inch) in each direction under the compression and extension of the spring 70.

Piston 90 preferably includes a low friction clearance seal 92 bonded thereto as seen in FIG. 4 and described in the '994 patent.

This single piece retainer/spring/threaded end and piston assembly has several advantages over the traditional three separate piece design described above. Virtually all debris generation inherent to the separate three piece design is eliminated since the machined retainer/spring/threaded end of the present invention does not have separate components that can rub together during expander piston axial displacement. Very slight mismatches in thread pitch of the prior art separate three piece design induced tilting of the components with respect to each other. Also, the machined spring of the present invention is preferably designed with a double start helix (as indicated by arrows H1 and H2 in FIG. 5) which makes the resultant radial forces during axial compression or extension symmetric. This reduces clearance seal side loading since the seal 92 will theoretically displace perfectly axially, without the intrinsic twist or rotation of the wound helical spring of the prior art.

We claim:

1. A closed cycle cryogenic cooler having an expander assembly and a piston assembly, said piston assembly comprising:
   a) a retainer, spring and threaded end all integrally formed from the same piece of material, said threaded end formed as a solid cylinder having an outer surface having threads formed therein and an outer diameter substantially the same as the outer diameter of said spring, said spring extending between said retainer and said threaded end, said threads adapted to thread directly to said piston assembly, and wherein said piston assembly is part of said expander assembly of the cryogenic cooler.

2. The closed cycle cryogenic cooler of claim 1, wherein said spring is a double start helix spring.

3. The closed cycle cryogenic cooler of claim 2, wherein said retainer, spring and threaded end are machined from a single piece of stainless steel.

4. The closed cycle cryogenic cooler of claim 1, wherein said retainer includes a recess adapted to engage a lip formed in a cylinder of said cryogenic cooler.

5. The closed cycle cryogenic cooler of claim 1 and further comprising a low friction clearance seal attached to said piston assembly.

* * * * *